(12) United States Patent
Trigiante

(10) Patent No.: US 9,139,661 B2
(45) Date of Patent: Sep. 22, 2015

(54) METHODS FOR BIOCOMPATIBLE DERIVITIZATION OF CELLULOSIC SURFACES

(75) Inventor: Giuseppe Trigiante, Watford (GB)

(73) Assignee: Yagna Limited, London (GB)

( * ) Notice: Subject to any disclaimer, the term of this patent is extended or adjusted under 35 U.S.C. 154(b) by 444 days.

(21) Appl. No.: 13/531,939

(22) Filed: Jun. 25, 2012

(65) Prior Publication Data

US 2013/0345415 A1  Dec. 26, 2013

(51) Int. Cl.
| | |
|---|---|
| *C08B 3/10* | (2006.01) |
| *D21H 17/14* | (2006.01) |
| *D21H 21/16* | (2006.01) |
| *D21H 25/06* | (2006.01) |
| *D21H 27/10* | (2006.01) |
| *D21H 11/16* | (2006.01) |
| *D21H 11/18* | (2006.01) |
| *D21H 11/20* | (2006.01) |
| *D21H 17/07* | (2006.01) |
| *D21H 17/11* | (2006.01) |
| *D21H 17/00* | (2006.01) |

(52) U.S. Cl.
CPC *C08B 3/10* (2013.01); *D21H 11/16* (2013.01); *D21H 11/18* (2013.01); *D21H 11/20* (2013.01); *D21H 17/07* (2013.01); *D21H 17/11* (2013.01); *D21H 17/14* (2013.01); *D21H 17/72* (2013.01); *D21H 21/16* (2013.01); *D21H 25/06* (2013.01); *D21H 27/10* (2013.01)

(58) Field of Classification Search
CPC ......................................................... C08B 3/10
USPC ....................................................... 536/58, 63
See application file for complete search history.

(56) References Cited

U.S. PATENT DOCUMENTS

2010/0173146 A1 *  7/2010  Ihara et al. ................... 428/323

FOREIGN PATENT DOCUMENTS

SU           174613 A  * 11/1962

* cited by examiner

*Primary Examiner* — Mark Shibuya
*Assistant Examiner* — Everett White
(74) *Attorney, Agent, or Firm* — MDIP LLC

(57) ABSTRACT

The present invention describes methods of treating cellulosic materials with a composition that provides increased hydrophobicity to such materials without sacrificing the biodegradability thereof. The methods as disclosed provide for esterification of available hydroxyl groups on cellulosic materials, where such hydroxyl groups are "masked" by bulky organic chains, including that the disclosure provides products made by such methods. The materials thus treated display higher hydrophobicity, barrier function, and mechanical properties, and may be used in any application where such features are desired.

17 Claims, 1 Drawing Sheet

Before treatment
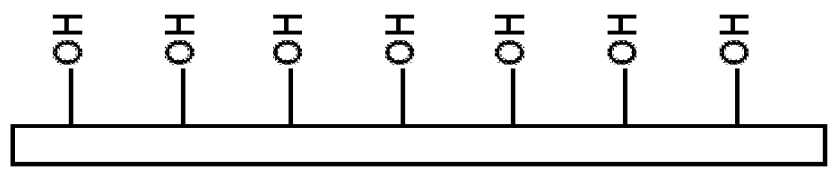
After treatment
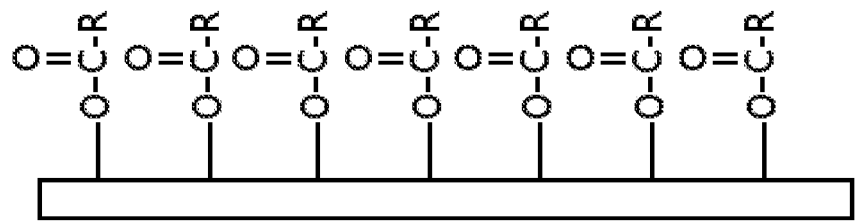

METHODS FOR BIOCOMPATIBLE DERIVITIZATION OF CELLULOSIC SURFACES

BACKGROUND OF THE INVENTION

1. Field of the Invention

The present invention relates generally to methods of treating cellulosic-compound containing materials, and more specifically to methods of making cellulose-based materials more hydrophobic using a composition which esterifies available hydroxyl groups, where such a composition is useful in modifying/coating surfaces of cellulose-based materials including packaging products.

2. Background Information

Cellulosic materials have a wide range of applications in industry as bulking agents, absorbents, and printing components. Their employment is preferred to that of other sources of material for their high thermal stability, good oxygen barrier function, and chemical/mechanical resilience (see, e.g., Aulin et al., Cellulose (2010) 17:559-574). Of great relevance is also the fact that these materials are fully biodegradable once dispersed in the environment, and that they are totally nontoxic. Cellulose and derivatives are therefore the material of choice for environmentally friendly solutions in applications such as packaging for foodstuff and disposable goods.

The many advantages of cellulose are nonetheless countered by the hydrophilicity of the material, which shows a high affinity for water and can easily absorb large amounts of it (see, e.g., Aulin et al., Langmuir (2009) 25(13):7675-7685). While this is a benefit for applications such as absorbents and tissues, it becomes an issue when the safe packaging of watery material (e.g., foodstuffs) is required. Long term storage of food, especially ready made meals which contain a significant amount of water, is made problematic in cellulose trays as they would first become soggy and then ultimately disrupt under the hydration of their fibers.

This problem is usually addressed in the industry by coating the cellulose fiber with some kind of hydrophobic organic material, for example a resin or a polymer, which would physically shield the underlying hydrophilic cellulose from the water in the contents. Materials such as PVC are routinely used for this purpose and are physically attached (i.e., spray coated) on the surfaces to be treated.

A similar problem is encountered when sealing foodstuff in its container by means of a film. This film requires even more stringent properties than the container itself. On top of the resistance to mechanical stress, the film must be thin enough to be peeled off, should ideally be transparent, heat resistant, and impermeant to gases such as $CO_2$ and oxygen, non toxic, and hydrophobic. Again, plastic in the form of polymers and resin is the present solution of the industry.

The need to come up with more environmentally friendly, as well as renewable, packaging solutions has cast a shadow over the use of plastic. New materials have been designed which are either derived from natural sources or semi-synthetic sources and therefore are renewable and/or biodegradable. Materials such as poly-lactic acid (PLA) and poly hydroxyalkanoate (PHA) are the present golden standard for biodegradable "plastics." However, they suffer the drawbacks of heat instability and water sensitivity which severely limit their use in the packaging industry. It would be desirable to design a coating which is both heat resistant and hydrophobic, while maintaining the biodegradability requirement.

SUMMARY OF THE INVENTION

The present disclosure relates to methods of treating cellulosic materials, including treating cellulose-containing materials with a composition that provides increased hydrophobicity without sacrificing biodegradability of the cellulosic components. The methods as disclosed provide for esterification of available hydroxyl groups on cellulose and do not require the use of Lewis acids or separate catalysts to convert said hydroxyls to esters, where such hydroxyl groups are "masked" by bulky organic chains. The coating may be applied to pre-formed materials.

In embodiments, a method for treating a surface of a cellulose-containing (or cellulosic) material is disclosed including applying to the surface a composition containing an alkanoic acid derivative having the formula (I):

where R is a straight-chain, branched-chain, or cyclic aliphatic hydrocarbon radical having from 6 to 50 carbon atoms, and where X is Cl, Br, or O(CO)OR; a base, and a first solvent, heating the applied composition on the surface; rinsing the surface with a second solvent; and drying the rinsed surface; where the composition esterifies at least a portion of the hydroxyl groups available via the cellulose of the material.

In one aspect, the cellulose-containing material exhibits greater hydrophobicity relative to the cellulose-containing material without the treatment.

In one aspect, the base is organic. In a related aspect, the organic base includes aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, triethylamines, pyrazoles, pyrazolines, and combinations thereof.

In another aspect, the first and second solvents include pentane, hexane, heptane, octane, petroleum ether, naphtha, kerosene, petroleum, paraffin oil, benzene, toluene, xylene, mesitylene, ethylbenzene, diethylbenzene, methylene chloride, chloroform, 1,2-dichloro-ethane, chlorobenzene, carbon tetrachloride, tetrabromoethylene, cyclopentane, cyclohexane, methylcyclohexane, anisole (methyl phenyl ether), tert-butyl methyl ether, dibenzyl ether, diethyl ether, dioxane, diphenyl ether, methyl vinyl ether, tetrahydrofuran, triisopropyl ether, diethylene glycol diethyl ether, diethylene glycol dimethyl ether (diglyme), diethylene glycol monobutyl ether, diethylene glycol monomethyl ether, 1,2-dimethoxyethane (DME, monoglyme), ethylene glycol monobutyl ether, triethylene glycol dimethyl ether (triglyme), triethylene glycol monomethyl ether, acetone, diisobutyl ketone, methyl n-propyl ketone, methyl ethyl ketone, methyl isobutyl ketone, methyl formate, methyl acetate, ethyl acetate, n-propyl acetate, n-butyl acetate, and combinations thereof.

In one aspect, the cellulose-based material comprises a cellulose selected from the group consisting of nanocellulose, cellulose nanofibres, whiskers or microfibril, microfibrillated or nanofibril cellulose, cotton or cotton blends, sugarcane cellulose, and combinations thereof. In a related aspect, the cellulose-based material includes a carton for food storage, a bag for food storage, a bottle for carbonated liquid storage, a bottle for non-carbonated liquid storage, film for wrapping food, a garbage disposal container, a food handling implement, a fabric fibre (e.g., cotton or cotton blends), a water storage and conveying implement, alcoholic or non alcoholic drinks, an outer casing or screen for electronic goods, an internal or external piece of furniture, a curtain, upholstery, and combinations thereof.

In embodiments, a method for treating a surface of a cellulose-containing (or cellulosic) material is disclosed, including applying to the surface a composition containing a derivatizing agent which includes acid chlorides, acid bromides, acid iodides, anhydrides, ketenes, diketenes, chlorocarbolic acid esters, carbonic acid diesters, 2,5-diketooxazolidines, isatinic anhydride, isocyanates, carbamoyl chlorides, thiocyanates, thiocarbamoyl chlorides, sulfonyl chlorides, sulfonic acid anhydrides, N-chlorosulfonamides, sulfinic acid chlorides, N-chlorosulfinamides, and combinations thereof; a base; and a first solvent, heating the applied composition on the surface; rinsing the surface with a second solvent; and drying the rinsed surface; where the resulting surface of the cellulose-based material exhibits a water contact angle of about 100°.

In a related aspect, the composition esterifies at least a portion of the hydroxyl groups available via the cellulose of the material, and the esterified hydroxyl groups are stable up to at least about 200° C. In one aspect, the esterified hydroxyl groups are stable at temperatures between about −100° C. to about 250° C. In a further related aspect, the surface of the cellulose-based material exhibits a water contact angle of between about 60° to about 120°. In another related aspect, the surface treatment is chemically stable at temperatures of between about 200° C. to about 250° C. In one aspect, the esterified hydroxyl groups are stable at temperatures between about −100° C. to about 250° C. In another related aspect, the water vapor permeability of the treated surface is between about 10 Barrer units to about 20 Barrer units. In a further aspect, the oxygen permeability of the treated surface is between about 10 Barrer units to about 20 Barrer units.

In embodiments, the composition applied to the cellulose-based (or cellulosic) material is a biodegradable product. In a related aspect, the product includes a carton for food storage, a bag for food storage, a bottle for carbonated liquid storage, a bottle for non-carbonated liquid storage, film for wrapping food, a garbage disposal container, a food handling implement, a fabric fibre, a water storage and conveying implement, alcoholic or non alcoholic drinks, an outer casing or screen for electronic goods, an internal or external piece of furniture, a curtain and upholstery.

In embodiments, a method for treating a surface of a cellulose-containing (or cellulosic) material is disclosed including applying to the surface a composition containing an alkanoic acid derivative having the formula (I):

R—CO—X where R is a straight-chain, branched-chain, or cyclic aliphatic hydrocarbon radical having from 6 to 50 carbon atoms, and wherein X is Cl, Br, or O(CO)OR; a base; and a first solvent, heating the applied composition on said surface; rinsing the surface with a second solvent; and drying the rinsed surface; where the resulting treated cellulose-containing material exhibits properties including a water contact angle of about 100°, is stable up to at least about 200° C., an oxygen permeability of less than about 10 Barrer units, a water vapour permeability of less than about 20 Barrer units, and combinations thereof.

BRIEF DESCRIPTION OF THE DRAWINGS

FIG. 1 shows an illustration of the surface of a cellulosic material before and after treatment as disclosed.

DETAILED DESCRIPTION OF THE INVENTION

Before the present composition, methods, and methodologies are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "a derivitizing agent" includes one or more derivitizing agents, and/or compositions of the type described herein which will become apparent to those persons skilled in the art upon reading this disclosure and so forth.

Unless defined otherwise, all technical and scientific terms used herein have the same meaning as commonly understood by one of ordinary skill in the art to which this invention belongs. Any methods and materials similar or equivalent to those described herein may be used in the practice or testing of the invention, as it will be understood that modifications and variations are encompassed within the spirit and scope of the instant disclosure.

It is well known that esters are organic molecules with a high biodegradability as bacterial enzymes readily break them down. They are however relatively stable to chemical agents such as heat.

In embodiments, the present disclosure shows that by treating the surface of cellulose fibers with long chain alkanoic acid derivatives the resulting surface is made strongly hydrophobic, as the cellulosic hydroxyl groups are masked by bulky organic chains (see, e.g., FIG. 1). These organic chains, once removed by bacterial enzymes, are easily digested as such. The derivatized surface displays a great deal of heat resistance, being able to withstand temperatures as high as 250° C. and is obviously more impermeant to gases than the naked film underneath. It is also transparent and resistant to mechanical damage as it is bound together by covalent bonding. It is therefore an ideal solution to the problem of derivatizing the hydrophilic surface of cellulose, in any embodiment in which cellulose materials may be employed.

As used herein, "cellulosic" means natural, synthetic or semisynthetic materials that can be molded or extruded into objects or films or filaments, which may be used for making such objects or films or filaments, that is structurally and functionally similar to cellulose, e.g., coatings and adhesives (e.g., carboxymethylcellulose). In another example, cellulose, a complex carbohydrate $(C_6H_{10}O_5)_n$ that is composed of glucose units, which forms the main constituent of the cell wall in most plants, is cellulosic.

As used herein, "hydrophobicity" means the property of being water-repellent, tending to repel and not absorb water.

As used herein, "cellulose-containing material" means a composition which consists essentially of cellulose. For example, such material may include, but is not limited to, a carton for food storage, a bag for food storage, a bottle for carbonated liquid storage, a bottle for non-carbonated liquid storage, film for wrapping food, a garbage disposal container, a food handling implement, a fabric fibre (e.g., cotton or cotton blends), a water storage and conveying implement, alcoholic or non alcoholic drinks, an outer casing or screen for electronic goods, an internal or external piece of furniture, a curtain and upholstery.

As used herein, "water contact angle" means the angle measured through a liquid at which a liquid/vapor interface meets a solid surface. It quantifies the wettability of the solid surface by the liquid. The contact angle is a reflection of how strongly the liquid and solid molecules interact with each other, relative to how strongly each interacts with its own kind. On many highly hydrophilic surfaces, water droplets will exhibit contact angles of 0° to 30°. Generally, if the water contact angle is larger than 90°, the solid surface is considered hydrophobic.

As used herein, "water vapour permeability" means breathability or a textile's ability to transfer moisture. There are at least two different measurement methods. One, the MVTR Test (Moisture Vapour Transmission Rate) in accordance with ISO 15496, describes the water vapor permeability (WVP) of a fabric and therefore the degree of perspiration transport to the outside air. The measurements determine how many grams of moisture (water vapor) pass through a square meter of fabric in 24 hours (the higher the level, the higher the breathability).

As used herein, "oxygen permeability" means the degree to which a polymer allows the passage of a gas or fluid. Oxygen permeability (Dk) of a material is a function of the diffusivity (D) (i.e., the speed at which oxygen molecules traverse the material) and the solubility (k) (or the amount of oxygen molecules absorbed, per volume, in the material). Values of oxygen permeability (Dk) typically fall within the range $10\text{-}150 \times 10^{-11}$ $(cm^2\, ml\, O_2)/(s\, ml\, mmHg)$. A semi-logarithmic relationship has been demonstrated between hydrogel water content and oxygen permeability (Unit: Barrer unit). The International Organization for Standardization (ISO) has specified permeability using the SI unit hectopascal (hPa) for pressure. Hence $Dk=10^{-11}$ $(cm^2\, ml\, O_2)/(s\, ml\, hPa)$. The Barrer unit can be converted to hPa unit by multiplying it by the constant 0.75.

As used herein "biodegradable," including grammatical variations thereof, means capable of being broken down especially into innocuous products by the action of living things (e.g., by microorganisms).

As used herein, "neat" means there is substantially no other molecule present in the substance including the absence of a solvent.

The process as disclosed includes a one step reaction involving a solvent (e.g., toluene), an alkanoic acid derivative (e.g., acid halide) and a base such as pyridine to be placed on a cellulosic-containing surface and heated, in embodiments, for a 2-3 hour period (it should be readily apparent to one of skill in the art that the time period and temperature used in the reaction may vary depending on the reactants and may be adjusted accordingly). In embodiments, any resulting gases are vented. The process as disclosed ensures that the hydroxyl groups on the surface are permanently attached (covalently linked) to the alkyl groups and may only be degraded by bacterial enzymatic intervention or very harsh acid or base extremes.

The acid derivatives suitable for the practice of the present invention are those having the general formula:

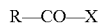    Formula (I)

wherein CO is the carbonyl group C=O, R is selected from straight-chain, branched-chain, or cyclic aliphatic hydrocarbon radicals having from about 6 to 50 carbon atoms and X represents the specific acid derivative substituent, such as Cl, Br or O(CO)OR in case of anhydrides. In general, it has been found that acyl groups containing fewer than about 6 carbon atoms in chain length do not produce satisfactory water-repellency. Accordingly, chain lengths greater than 6 carbon atoms may be used to practice the invention as disclosed. In embodiments, chain lengths may be 8-50, 10-40, and 10-30 carbon atoms. In embodiments, the carbon atom chain length may be 10-20 carbon atoms. Exemplary of compounds wherein R is selected from aliphatic hydrocarbon radicals are caprylyl chloride, decanoyl chloride, lauroyl chloride, palmitoyl chloride and myristoyl chloride. Exemplary of compounds wherein R is selected from cyclic aliphatic hydrocarbon radicals is cyclohexanecarboxylic acid halide. Generally, however, straight-chain acyclic aliphatic acid halides or anhydrides may be used for this process as they are usually cheaper and more readily available, and also because the branched-chain and cyclic hydrocarbon radicals are not easily biodegradable. In some embodiments, it may be desirable to employ a mixture of two or more acid anhydrides, and such embodiments are within the scope of the present disclosure. Also, acid bromides and acid iodides react in similar ways to the acid chlorides and may be substituted therefor. However, because the bromides and iodides are generally more expensive and less readily available, the equivalent acid chlorides may be used. For the practice of the present methods, ordinary commercial grade acid chlorides have been found wholly suitable, the only necessary precaution being to prevent exposure of the easily hydrolyzable acid anhydrides to moisture.

In embodiments, acid derivatives (or derivatizing agents) include acid chlorides, acid bromides, acid iodides, anhydrides, ketenes, diketenes, chlorocarbolic acid esters, carbonic acid diesters, 2,5-diketooxazolidines, isatinic anhydride, isocyanates, carbamoyl chlorides, thiocyanates, thiocarbamoyl chlorides, sulfonyl chlorides, sulfonic acid anhydrides, N-chlorosulfonamides, sulfinic acid chlorides, N-chlorosulfinamides, and combinations thereof. In embodiments, the amount of acid derivative (or derivatizing agent) present in the coating mixture is about 1M to about 2M, in embodiments about 2M to about 3M, in embodiments about 1M to about 3M.

While not being bound by theory, the thickness of the coating as disclosed is independent of the amount of reagent, and instead relies on the length of the alkyl chain R, as there is no physical absorption of the coating on the substrate, but a chemical linking reaction, which may be variable, on the hydroxyl layer of the surface. Further, such reaction (i.e., esterification) may not be reiterated once the hydroxyl groups have reacted with the acid derivative.

No special preparation of the material is necessary in practicing this invention, including that no Lewis acids or separate catalysts are required, except that the surface to be treated should be clean and free of dirt and excess moisture. In embodiments, normally air-dried material which contains a few percent adsorbed moisture may be used. In some embodiments, material may be dried prior to treatment (e.g., at 110° C. for a few minutes) to remove most of the adsorbed moisture. The degree of water impermeability may be controlled by selection of the thickness of the cellulose to be treated and also by varying the treatment conditions, in particular the acid derivative selected, the concentration of acid derivative in the reaction chamber and the duration of the exposure.

Depending on the source, the cellulose may be nanocellulose, cellulose nanofibres, whiskers or microfibril, microfibrillated, cotton or cotton blends, or nanofibril cellulose.

In embodiments, the amount of coating applied is sufficient to completely cover at least one surface of a cellulose-containing material. For example, in embodiments, the coating may be applied to the complete outer surface of a container, the complete inner surface of a container, or a combination thereof. In other embodiments, the complete upper surface of a film may be covered by the coating, or the complete under surface of a film may be covered by the coating, or a combination thereof. In some embodiments, the lumen of a device/instrument may be covered by the coating or the outer surface of the device/instrument may be covered by the coating, or a combination thereof. In embodiment, the amount of coating applied is sufficient to partially cover at least one surface of a cellulose-containing material. For example, only those surfaces exposed to the ambient atmosphere are covered by the coating, or only those surfaces that are not exposed to the ambient atmosphere are covered by the coating. As will be apparent to one of skill in the art, the amount of coating applied will be dependent on the use of the material to be covered.

Any suitable coating process may be used to deliver any of various the coatings applied in the course of practicing this aspect of the method. In embodiments, coating processes include immersion, spraying, painting, and any combination of any of these processes, alone or with other coating processes adapted for practicing the methods as disclosed.

In general, longer chain acid derivatives give greater impermeability, other factors such as depth of cellulose treated being equal. By increasing the concentration of acid derivative, for example, to about one molar or increasing the exposure time, an acid derivative may react more deeply into the cellulose being treated with the net result that again improved water-repellent characteristics are exhibited.

The invention correspondingly provides a method to achieve such coating by dissolving the modifying agent in a suitable solvent, such as a C4-C8 ether, ester, ketones, amides or nitriles, or aromatic compound such as xylene or toluene, alongside a non-nucleophilic base such as pyridine, to absorb the generated acid. The mixture is sprayed on the material to be derivatized and heated to about 120 to about 210° C. or about 120 to about 150° C. for a variable period (e.g., for about 2 to about 2.5 hours, from about 2.5 hours to about 3 hours or from about 2 hours to about 3 hours). The surface may then be rinsed with detergent (surfactant) and water or a solvent (e.g., acetone) and dried again. A surfactant may be an ionic (cationic and anionic) surfactant, a non-ionic surfactant, or a combination thereof.

Any suitable basic neutralization reagent may be used in accordance with the present disclosure as long as the base is non-nucleophilic, so as not to react with the acid derivative. In embodiments, suitable basic neutralization agents may include organic basic agents. Suitable basic agents may include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, triethylamine, pyrazoles, pyrazolines, and combinations thereof. In embodiments, the monocyclic and polycyclic compounds may be unsubstituted or substituted at any carbon position on the ring. In embodiments, the amount of base present in the coating may be about 1M to about 2M, about 2M to about 4M, about 1M to about 3M, or about 1M to about 5M.

Suitable solvents include non-nucleophilic aliphatic hydrocarbons such as pentane, hexane, heptane, octane, and petroleum ether, naphtha, kerosene, petroleum, paraffin oil, etc.; aromatic hydrocarbons such as benzene, toluene, xylene, mesitylene, ethylbenzene, diethylbenzene, etc.; halogenated hydrocarbons, such as methylene chloride, chloroform, 1,2-dichloro-ethane, chlorobenzene, carbon tetrachloride, tetrabromoethylene, etc.; alicyclic hydrocarbons, such as cyclopentane, cyclohexane, and, methylcyclohexane, etc.; ethers, such as anisole (methyl phenyl ether), tert-butyl methyl ether, dibenzyl ether, diethyl ether, dioxane, diphenyl ether, methyl vinyl ether, tetrahydrofuran, triisopropyl ether etc.; glycol ethers, such as diethylene glycol diethyl ether, diethylene glycol dimethyl ether (diglyme), diethylene glycol monobutyl ether, diethylene glycol monomethyl ether, 1,2-dimethoxyethane (DME, monoglyme), ethylene glycol monobutyl ether, triethylene glycol dimethyl ether (triglyme), triethylene glycol monomethyl ether etc.; ketones, such as acetone, diisobutyl ketone, methyl n-propyl ketone; methyl ethyl ketone, methyl isobutyl ketone etc.; esters, such as methyl formate, methyl acetate, ethyl acetate, n-propyl acetate, and n-butyl acetate, etc.; carboxylic acids, such as formic acid, acetic acid, propionic acid, butyric acid, etc. One or more of these compounds may be used, alone or in combination. In embodiments, the amount of solvent present may be about 50% to about 99%, about 60% to about 95%, about 75% to about 90% (vol %).

It will be apparent to one of skill in the art that the selection of cellulose to be treated, the acid derivative reagent, the reaction temperature (or vapor pressure), and the exposure time are process parameters that may be optimized by routine experimentation to suit any particular application for the final product.

In embodiments, among useful coating agents, such agents may include, but are not limited to, acid halides, acid anhydrides, esters, ketenes, diketenes, chlorocarbolic acid esters, carbonic acid diesters, 2,5-diketooxazolidines, isatinic anhydride, isocyanates, carbamoyl chlorides, thiocyanates, thiocarbamoyl chlorides, sulfonyl chlorides, sulfonic acid anhydrides, N-chlorosulfonamides, sulfinic acid chlorides, N-chlorosulfinamides.

The derivatized materials have altered physical properties which may be defined and measured using appropriate tests known in the art. For hydrophobicity the analytical protocol is the contact angle measurement, wherein a droplet of water is deposited on the surface and the angle of the interface measured using one of many commercial instruments available for the purpose. A specific standardized protocol to follow is defined by the American Society for Testing and Materials (protocol ASTM D7334-08).

The permeability of a surface to various gases such as water vapour and oxygen may also be altered by the coating process as the barrier function of the material is enhanced. The standard unit measuring permeability is the Barrer and protocols to measure these parameters are also available in the public domain (ASTM std F2476-05 for water vapour and ASTM std F2622-8 for oxygen).

In embodiments, materials treated according to the presently disclosed procedure display a complete biodegradability as measured by the degradation in the environment under microorganismal attack.

Various methods are available to define and test biodegradability including the shake-flask method (ASTM E1279-89 (2008)) and the Zahn-Wellens test (OECD TG 302 B).

Materials suitable for treatment by the process of this invention include various forms of cellulose, such as cotton fibers, plant fibers such as flax, wood fibers, regenerated cellulose (rayon and cellophane), partially alkylated cellulose (cellulose ethers), partially esterified cellulose (acetate rayon), and other modified cellulose materials which have a substantial portion of their hydroxyl groups available for reaction. As stated above, the term "cellulose" includes all of these materials and others of similar polysaccharide structure and having similar properties. Among these the relatively novel material microfibrillated cellulose (nanocellulose) (as defined e.g. in U.S. Pat. No. 4,374,702 and application 20090221812, herein incorporated by reference in their entireties) is particularly suitable for this application as it can form transparent films of high specific resistance. In other embodiments, celluloses may include but are not limited to, cellulose triacetate, cellulose propionate, cellulose acetate propionate, cellulose acetate butyrate, nitrocellulose (cellulose nitrate), cellulose sulfate, celluloid, methylcellulose, ethylcellulose, ethyl methyl cellulose, hydroxyethyl cellulose, hydroxypropyl cellulose, hydroxyethyl methyl cellulose, hydroxypropyl methyl cellulose, ethyl hydroxyethyl cellulose, carboxymethyl cellulose, and combinations thereof.

The covalent modification/coating/cross-linking of the cellulose as disclosed, in addition to increasing its hydrophobicity, may also increase its tensile strength and flexibility, thereby further widening its spectrum of use. All biodegradable and partially biodegradable products made from or by using the modified cellulose disclosed in this application are within the scope of the disclosure.

Among the possible applications of the coating technology such items include, but are not limited to, containers for all purpose such as boxes, trays, shopping bags, pipes and water conduits, food grade disposable cutlery, plates and bottles, screens for TV and mobile devices, clothing (e.g., cotton or cotton blends) and medical devices to be used on the body or inside it such as contraceptives. Also, the coating technology as disclosed may be used on furniture and upholstery, outdoors camping equipment and the like.

The following examples are intended to illustrate but not limit the invention.

EXAMPLES

Example 1

Coating a Thin Transparent Film Made of Microfibrillated Cellulose

The upper and lower surfaces of a thin transparent film made of microfibrillated cellulose were treated with a composition comprising 1 ml of lauroyl chloride (neat) and 1 ml of pyridine (neat) in 20 ml of toluene (neat). After coating the surfaces of the film with the composition, the film was heated to about 110° C. for about 3 hours. The sample was subsequently rinsed with acetone and dried. After drying, the sample was assessed for heat stability and water contact angle.

The sample coating was chemically stable up to about 200° C., and showed a water contact angle of about 100°, which demonstrates that the material was now hydrophobic.

Example 2

Coating a Food Tray Made of Sugarcane Cellulose

A food tray of 15 cm by 20 cm in size was treated on its food contact (upper) surface with a composition comprising 10 ml of myristoyl bromide (neat) and 10 ml of triethylamine (neat) in 1000 ml of xylene (neat). After coating the surface(s) of the tray with the composition, the tray was heated to about 140° C. for about 3 hours. The tray was subsequently rinsed with acetone and dried. After drying, the tray was assessed for heat stability, water absorption, and biodegradability.

The tray coating was chemically stable up to about 250° C., and showed no water absorption up to 30 days after treatment, while remaining fully biodegradable.

Although the invention has been described with reference to the above examples, it will be understood that modifications and variations are encompassed within the spirit and scope of the invention. Accordingly, the invention is limited only by the following claims. All references disclosed herein are hereby incorporated by reference in their entireties.

What is claimed:

1. A method for treating a solid surface of a cellulose-containing material comprising:
   applying to said solid surface a composition comprising:
      an alkanoic acid derivative having the formula (I):

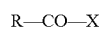

wherein R is a straight-chain, branched-chain, or cyclic aliphatic hydrocarbon radical having from 10 to 40 carbon atoms, and wherein X is Cl, Br, or O(CO)OR;
      a base; and
      a first solvent,
   heating the applied composition on said solid surface;
   rinsing said solid surface with a second solvent; and
   drying said rinsed solid surface;
   wherein said composition esterifies at least a portion of the hydroxyl groups available on the cellulose of the material, and wherein the resulting treated surface of the cellulose-containing material exhibits a water contact angle of between 60° to about 120°.

2. The method of claim 1, wherein the cellulose-containing material exhibits greater hydrophobicity relative to the cellulose-containing material without said treating.

3. The method of claim 1, wherein the base is non-nucleophilic.

4. The method of claim 3, wherein the base is organic.

5. The method of claim 4, wherein the organic base is selected from the group consisting of aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof.

6. The method of claim 4, wherein the number of carbon atoms is 12 or 14.

7. The method of claim 1, wherein the first solvent is selected from the group consisting of pentane, hexane, heptane, octane, petroleum ether, naphtha, kerosene, petroleum, paraffin oil, benzene, toluene, xylene, mesitylene, ethylbenzene, diethylbenzene, methylene chloride, chloroform, 1,2-dichloro-ethane, chlorobenzene, carbon tetrachloride, tetrabromoethylene, cyclopentane, cyclohexane, methylcyclohexane, anisole (methyl phenyl ether), tert-butyl methyl ether, dibenzyl ether, diethyl ether, dioxane, diphenyl ether, methyl vinyl ether, tetrahydrofuran, diisopropyl ether, 1,2-dimethoxyethane (DME, monoglyme), acetone, diisobutyl ketone, methyl n-propyl ketone; methyl ethyl ketone, methyl isobutyl ketone, methyl formate, methyl acetate, ethyl acetate, n-propyl acetate, n-butyl acetate, and combinations thereof, and wherein the second solvent is selected from the group consisting of pentane, hexane, heptane, octane, petroleum ether, naphtha, kerosene, petroleum, paraffin oil, benzene, toluene, xylene, mesitylene, ethylbenzene, diethylbenzene, methylene chloride, chloroform, 1,2-dichloro-ethane, chlorobenzene, carbon tetrachloride, tetrabromoethylene, cyclopentane, cyclohexane, methylcyclohexane, anisole (methyl phenyl ether), tert-butyl methyl ether, dibenzyl ether, diethyl ether, dioxane, diphenyl ether, methyl vinyl ether, tetrahydrofuran, diisopropyl ether, diethylene glycol diethyl ether, diethylene glycol dimethyl ether (diglyme), diethylene glycol monobutyl ether, diethylene glycol monomethyl ether, 1,2-dimethoxyethane (DME, monoglyme), ethylene glycol monobutyl ether, triethylene glycol dimethyl ether (triglyme), triethylene glycol monomethyl ether, acetone, diisobutyl ketone, methyl n-propyl ketone; methyl ethyl ketone, methyl isobutyl ketone, methyl formate, methyl acetate, ethyl acetate, n-propyl acetate, n-butyl acetate, and combinations thereof.

8. The method of claim 1, where the cellulose-containing material comprises a cellulose selected from the group consisting of nanocellulose, cellulose nanofibres, whiskers or microfibril, microfibrillated or nanofibril cellulose, sugarcane cellulose, and combinations thereof.

9. The method of claim 1, wherein the cellulose-containing material is selected from the group consisting of a carton for food storage, a bag for food storage, a bottle for carbonated liquid storage, a bottle for non-carbonated liquid storage, film for wrapping food, a garbage disposal container, a food handling implement, a fabric fibre, a water storage and conveying implement, a container for alcoholic or non alcoholic drinks, an outer casing or screen for electronic goods, an internal or external piece of furniture, a curtain, upholstery, and combinations thereof.

10. A method for treating a solid surface of a cellulose-containing material comprising:
applying to said surface a composition comprising:
an alkanoic acid derivative having the formula (I):

wherein R is a straight-chain, branched-chain, or cyclic aliphatic hydrocarbon radical having from 10 to 40 carbon atoms, and wherein X is Cl, Br, I or O(CO)OR derived from an agent selected from the group consisting of acid chlorides, acid bromides, acid iodides, anhydrides, and combinations thereof;
a base; and
a first solvent,
heating the applied composition on said solid surface;
rinsing said solid surface with a second solvent; and
drying said rinsed solid surface;
wherein said composition esterifies at least a portion of the hydroxyl groups available on the cellulose of the material, and wherein the resulting solid surface of the cellulose-containing material exhibits a water contact angel of about 100°.

11. The method of claim 10, wherein said composition esterifies at least a portion of the hydroxyl groups available on the cellulose of the material, and wherein said esterified hydroxyl groups are stable up to at least about 200° C.

12. The method of claim 10, wherein the base is selected from the group consisting of ammonium hydroxide, potassium hydroxide, sodium hydroxide, sodium carbonate, sodium bicarbonate, lithium hydroxide, potassium carbonate, aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof.

13. The method of claim 10, wherein the first solvent is selected from the group consisting of pentane, hexane, heptane, octane, petroleum ether, naphtha, kerosene, petroleum, paraffin oil, benzene, toluene, xylene, mesitylene, ethylbenzene, diethylbenzene, methylene chloride, chloroform, 1,2-dichloro-ethane, chlorobenzene, carbon tetrachloride, tetrabromoethylene, cyclopentane, cyclohexane, methylcyclohexane, anisole (methyl phenyl ether), tert-butyl methyl ether, dibenzyl ether, diethyl ether, dioxane, diphenyl ether, methyl vinyl ether, tetrahydrofuran, diisopropyl ether, 1,2-dimethoxyethane (DME, monoglyme), acetone, diisobutyl ketone, methyl n-propyl ketone; methyl ethyl ketone, methyl isobutyl ketone, methyl formate, methyl acetate, ethyl acetate, n-propyl acetate, n-butyl acetate, and combinations thereof, and wherein the second solvent is selected from the group consisting of pentane, hexane, heptane, octane, petroleum ether, naphtha, kerosene, petroleum, paraffin oil, benzene, toluene, xylene, mesitylene, ethylbenzene, diethylbenzene, methylene chloride, chloroform, 1,2-dichloro-ethane, chlorobenzene, carbon tetrachloride, tetrabromoethylene, cyclopentane, cyclohexane, methylcyclohexane, anisole (methyl phenyl ether), tert-butyl methyl ether, dibenzyl ether, diethyl ether, dioxane, diphenyl ether, methyl vinyl ether, tetrahydrofuran, diisopropyl ether, diethylene glycol diethyl ether, diethylene glycol dimethyl ether (diglyme), diethylene glycol monobutyl ether, diethylene glycol monomethyl ether, 1,2-dimethoxyethane (DME, monoglyme), ethylene glycol monobutyl ether, triethylene glycol dimethyl ether (triglyme), triethylene glycol monomethyl ether, acetone, diisobutyl ketone, methyl n-propyl ketone; methyl ethyl ketone, methyl isobutyl ketone, methyl formate, methyl acetate, ethyl acetate, n-propyl acetate, n-butyl acetate, and combinations thereof.

14. The method of claim 13, wherein the number of carbon atoms in the derivatizing agent is 12 or 14.

15. The method of claim 10, where the cellulose-containing material comprises a Cellulose selected from the group consisting of nanocellulose, cellulose nanofibres, whiskers or microfibril cellulose, microfibrillated or nanofibril cellulose, sugarcane cellulose, and combinations thereof.

16. A method for treating a solid surface of a cellulose-containing material comprising:
applying to said surface a composition comprising:
an alkanoic acid derivative having the formula (I):

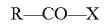

wherein R is a straight-chain, branched-chain, or cyclic aliphatic hydrocarbon radical having from 10 to 40 carbon atoms, and wherein X is Cl, Br, I or O(CO)OR;
a base;
a first solvent;
heating the applied composition on said solid surface;
rinsing said solid surface with a second solvent; and
drying said rinsed solid surface;
wherein said composition esterifies at least a portion of the hydroxyl groups available on the cellulose of the material, and wherein the resulting treated cellulose-containing material exhibits a water contact angel of about 100°, is stable up to at least about 200° C., an oxygen permeability of less than about 10 Barrer units, a water vapour permeability of less than about 20 Barrer units, and combinations thereof.

17. The method of claim 16, wherein the number of carbon atoms is 12 or 14.

* * * * *